United States Patent
Dehlsen

(10) Patent No.: US 9,334,849 B2
(45) Date of Patent: May 10, 2016

(54) FLOATING TOWER FRAME FOR OCEAN CURRENT TURBINE SYSTEM

(71) Applicant: Aquantis, Inc., Santa Barbara, CA (US)

(72) Inventor: James G. P. Dehlsen, Santa Barbara, CA (US)

(73) Assignee: Aquantis, Inc., Santa Barbara, CA (US)

( * ) Notice: Subject to any disclaimer, the term of this patent is extended or adjusted under 35 U.S.C. 154(b) by 0 days.

(21) Appl. No.: 14/217,060

(22) Filed: Mar. 17, 2014

(65) Prior Publication Data

US 2015/0260152 A1    Sep. 17, 2015

(51) Int. Cl.
*F03B 17/00* (2006.01)
*F03B 17/06* (2006.01)
*F03B 13/26* (2006.01)

(52) U.S. Cl.
CPC .............. *F03B 17/061* (2013.01); *F03B 13/264* (2013.01); *F05B 2240/40* (2013.01); *F05B 2240/93* (2013.01); *F05B 2260/02* (2013.01); *F05B 2270/1011* (2013.01); *F05B 2270/20* (2013.01); *F05B 2270/327* (2013.01); *Y02P 70/527* (2015.11)

(58) Field of Classification Search
CPC ....... Y02E 10/28; Y02E 10/38; F03B 17/061; F03B 13/264; F05B 2240/97; F05B 2240/93; F05B 2240/95; F05B 2270/18; B63B 2035/4466
USPC ......... 415/4.3, 5.5, 60, 67, 213.1, 908; 416/9, 416/121, 141, 150
See application file for complete search history.

(56) References Cited

U.S. PATENT DOCUMENTS

| | | | |
|---|---|---|---|
| 5,440,176 A * | 8/1995 | Haining | 290/54 |
| 6,652,221 B1 | 11/2003 | Praenkel | |
| 6,856,036 B2 | 2/2005 | Belinsky | |
| 7,298,054 B2 | 11/2007 | Hirsch | |
| 7,307,356 B2 | 12/2007 | Fraenkel | |
| 7,352,078 B2 * | 4/2008 | Gehring | 290/54 |
| 8,736,096 B2 * | 5/2014 | Kiyose et al. | 290/54 |

(Continued)

FOREIGN PATENT DOCUMENTS

| CN | 103256171 A | 8/2013 |
|---|---|---|
| GB | 2447774 A | 9/2008 |

(Continued)

OTHER PUBLICATIONS

SeaGen S, "Marine Current Turbines," downloaded from www.marineturbines.com/SeaGen-Products on Sep. 26, 2014, 2 pgs.

*Primary Examiner* — Nathaniel Wiehe
*Assistant Examiner* — Eldon Brockman
(74) *Attorney, Agent, or Firm* — San Diego IP Law Group LLP

(57) ABSTRACT

The present invention provides a floating tower frame for an ocean current turbine system comprising multiple rotors, which is designed to generate electrical power or high pressure seawater for reverse osmosis or fresh water production from steady (gyre) or tidal currents. Turbines are mounted near the base of a plurality of floating towers held in parallel between a horizontal truss structure above water and a horizontal wing at the base of the towers, below the surface. The center of gravity of the system is located in the bottom one third of the towers below the water line, while the center of buoyancy is in the top third of the towers below the surface, and the entire structure floats vertically, with respect to the towers.

19 Claims, 11 Drawing Sheets

(56) References Cited

U.S. PATENT DOCUMENTS

| | | | |
|---|---|---|---|
| 2006/0232075 A1* | 10/2006 | Fraenkel | 290/54 |
| 2007/0241566 A1* | 10/2007 | Kuehnle | 290/53 |
| 2008/0018115 A1* | 1/2008 | Orlov | 290/54 |
| 2010/0074750 A1 | 3/2010 | Henriksen | |
| 2011/0318178 A1* | 12/2011 | Andersen | 416/1 |
| 2015/0021919 A1* | 1/2015 | Dehlsen et al. | 290/54 |

FOREIGN PATENT DOCUMENTS

| | | |
|---|---|---|
| JP | 2009-114904 A | 5/2009 |
| KR | 10-0936907 B1 | 1/2010 |
| WO | 2009068712 A1 | 6/2009 |

* cited by examiner

FLOATING TOWER FRAME FOR OCEAN CURRENT TURBINE SYSTEM

BACKGROUND OF THE INVENTION

1. Field of Invention

This invention relates to ocean current turbines and, more specifically, to a floating tower frame turbine system to generate electrical power and/or to produce fresh water from seawater.

2. Description of Related Art

Ocean currents are a major, largely untapped energy resource. Research and development in this area is driven by the need to generate electricity from renewable energy resources, particularly in view of the rising level of $CO_2$ in the earth's atmosphere from combustion of carbon fuels and the resulting impact on climate from global warming.

An ocean current is a continuous, directed movement of seawater generated by the forces acting upon this flow, such as breaking waves, wind, Coriolis effect, evaporation, temperature and salinity differences (cabbeling), and tides caused by the gravitational pull of the Moon and the Sun. Depth contours, shoreline configurations and interaction with other currents influence a current's direction and strength. Ocean gyre currents are relatively constant and generally flow in one direction, in contrast to periodic tidal currents that reverse in flow direction due to gravitational forces. While ocean currents move slowly relative to typical wind speeds, they carry a great deal of energy because of the density of water, which is more than 800 times that of air. The following table illustrates the average power density as a function of wind or current flow speeds for a wind turbine or marine turbine, respectively.

| Wind Turbine | | Marine Turbine | |
| --- | --- | --- | --- |
| Average Wind Speed (typical range-m/s) | Average Power Density $W/M^2$ | Average Flow Speed (typical range - m/s) | Average Power Density $W/M^2$ |
| 6 | 132 | .99 | 498 |
| 7.5 | 258 | 1.20 | 886 |
| 8.5 | 376 | 1.43 | 1500 |
| 10 | 613 | 1.60 | 2101 |

With gyre currents, the constancy of flow also provides the opportunity for added energy capture, compared to the intermittency of wind. Because of these physical properties, ocean currents contain an enormous amount of energy that can be captured and converted to a usable form.

The United States, the United Kingdom, Japan, and other countries are pursuing ocean current energy; however, marine current energy is at an early stage of development. Relative to wind, the energy potential wave and tidal resources is the least understood and its technology is the least mature. Commercial grid-connected ocean turbines are in the infancy and only a small number of prototypes and demonstration units have been tested.

For ocean current energy to be utilized successfully at a commercial scale, a number of engineering and technical challenges need to be addressed, including: avoidance of blade cavitation (bubble formation); prevention of marine growth buildup; reliability (since at-sea maintenance costs are potentially high); efficient methods of deployment; corrosion resistance; and anchoring and mooring methods. System reliability is of particular importance, since the logistics of at-sea maintenance is likely to be limited by accessibility, and windows of acceptable weather and sea-states conditions, therefore the costs can be high. Furthermore any system deployed in the ocean must be able to survive large waves and storms, raising the capital cost and maintenance. Moreover, an ocean current turbine system must have minimal impact on the marine environment, such as fishing grounds and beach shoreline, and be with ocean navigation.

Korean Patent No. 936907 to Kim discloses an ocean floor mounted, two rotor tidal generator system in which a main body automatically rotates so that a rotor always faces the tidal flow. This system is expensive due to the structural requirements necessary for dealing with the overturning moment of the whole structure from thrust load of the current on the rotors. This limits deployment to shallow locations. Installation is costly since it is only possible during short periods between tidal flows. This permanent installation precludes returning the structure to the shore base facility for long-term servicing. Servicing just one rotor results in raising all the rotors above the surface and shutting down all of the rotors (not just the one requiring servicing) of the entire system resulting in significant lost production. Moreover, the design requires both rotors to operate simultaneously since a shutdown of one rotor would yaw the rotor support structure toward alignment with the flow rather than squarely facing the flow, significantly reducing production.

U.S. Pat. No. 7,307,356 to Fraenkel discloses a dual rotor marine current turbine mounted on the ocean floor. This system is also expensive due to structural requirements to deal with the overturning moment of the whole structure from thrust load of the current on the rotors. Installation and securing to the ocean floor is only possible during short periods between tidal flows. Rotors and support structure can be raised for servicing, however all power generation is shut down if only one rotor requires servicing. Rotors and support structure do not yaw for change in tidal flow direction.

Great Britain Patent No. 2,447,774 to Fraenkel discloses a deep water current turbine system anchored to an ocean floor. If one rotor malfunctions, requiring servicing, the entire system must be shut down and brought to the surface. In a tidal flow, this would be difficult, as the flow in one direction drops off and waters calm, providing a brief window for servicing operations before the flow reverses, at which point the whole floating structure swings around to an opposite position on the surface due to the opposite flow direction. This design appears costly, complex, and dangerous. It also requires a much larger operating footprint represented by the full surface of the operating water column perimeter, which results in higher power collection cabling costs, lower power generating density per unit of seafloor area, and the potential for rotor entanglement with the mooring lines.

These prior art systems are not capable of producing cost-effective, utility-scale electrical power output to meet modern energy needs. What is needed is a system for efficiently capturing power from ocean or tidal currents, to generate electric power or produce desalinated water, which is cost effective to manufacture, deploy, and maintain.

SUMMARY OF THE INVENTION

The present invention overcomes these and other deficiencies of the prior art by providing a novel floating tower frame and ocean current turbine system that is designed to generate electrical power or high pressure seawater for fresh water production from common forms of marine currents. Turbines (or "rotors") are sub-surface, mounted near the base of a plurality of floating towers held in parallel between a horizontal truss structure above water and a horizontal streamlined wing at the base of the towers, below the surface. The center of gravity of the system is located in the bottom one third of the towers below the water line, while the center of buoyancy is in the top third of the towers below the surface, and the entire structure floats vertically, with respect to the towers. The structure appears as a horizontal ladder floating with one side above the water surface.

In an embodiment of the invention, a current turbine system comprises: a floating frame, wherein the floating frame comprises: a truss, a base wing, and a plurality of towers connecting the truss to the wing; and a plurality of turbines, wherein a turbine is located on a respective one of the plurality of towers. In operation, the truss sits above a water line, the wing sits below the water line, a center of gravity of the overall current turbine system is located in a bottom third of the plurality of towers near the wing, and a center of buoyancy is located in a top third of the plurality of towers near the truss. The wing can be either fixed or can pitch relative to the plurality of towers. Each tower comprises a collar for affixing a turbine base and the turbine to a tower. The collar is rotated about its tower by a yawing drive for the attached turbine to face the current direction as the flow direction changes. Alternatively, the tower includes a rotatable bearing connection at the truss and at the wing. Yaw motors on the truss, yaw the turbine and tower as needed to align with the flow direction. Each tower further comprises a track/elevator for raising and lowering the turbine, relative to the truss and the turbine's operating position on the tower. A crane is provided to raise and lower the turbine although this may also be accomplished by a geared or hydraulic system acting against the tower track to move the turbine. For transit to the operating site, the frame structure lies flat on the surface and the turbines are positioned toward the center of the towers. The vertical operating position occurs when the turbine is moved from the tower center along the track toward the turbine operating position, thereby changing the center of gravity toward the lower end of the tower. This causes a 90° rotation of the frame, with the bottom end of the frame, sinking and stabilizing in a vertical position.

The present invention provides a marine current turbine system that is efficient to deploy; omnidirectional to the current flow; and can reduce turbine torque by yawing for current overspeed control. It is scalable, structurally efficient, and individual turbines may be raised and lowered between the operations deck on the truss and the turbine's operating position below the ocean surface. The track that facilitates raising and lowering a turbine is also used on installation, to rotate the frame from horizontal to a vertical position. The present invention provides safe, above the water surface for servicing of an individual turbine while other turbines continue to operate. By reversing the installation processes, the present invention can be returned to the deployment/service base, for periodic long-term maintenance requirements. Turbines of the present invention may rotate, i.e., yaw, about a tower axis in order to capture the power of directionally changing fluid flows such as tidal currents or meandering ocean gyre currents, or may yaw the turbine away from the axis of the flow, to shed load on the rotors if the current speed exceeds the turbine's rated capacity.

The foregoing, and other features and advantages of the invention, will be apparent from the following, more particular description of the preferred embodiments of the invention, the accompanying drawings, and the claims.

BRIEF DESCRIPTION OF THE DRAWINGS

For a more complete understanding of the present invention, the objects and advantages thereof, reference is now made to the ensuing descriptions taken in connection with the accompanying drawings briefly described as follows.

—FIG. 2A illustrates the ocean current turbine system during transportation to an operating site; FIG. 2B illustrates the ocean current turbine system being rotated into an operating position at the operating site:

DETAILED DESCRIPTION OF PREFERRED EMBODIMENTS

Figure 1:
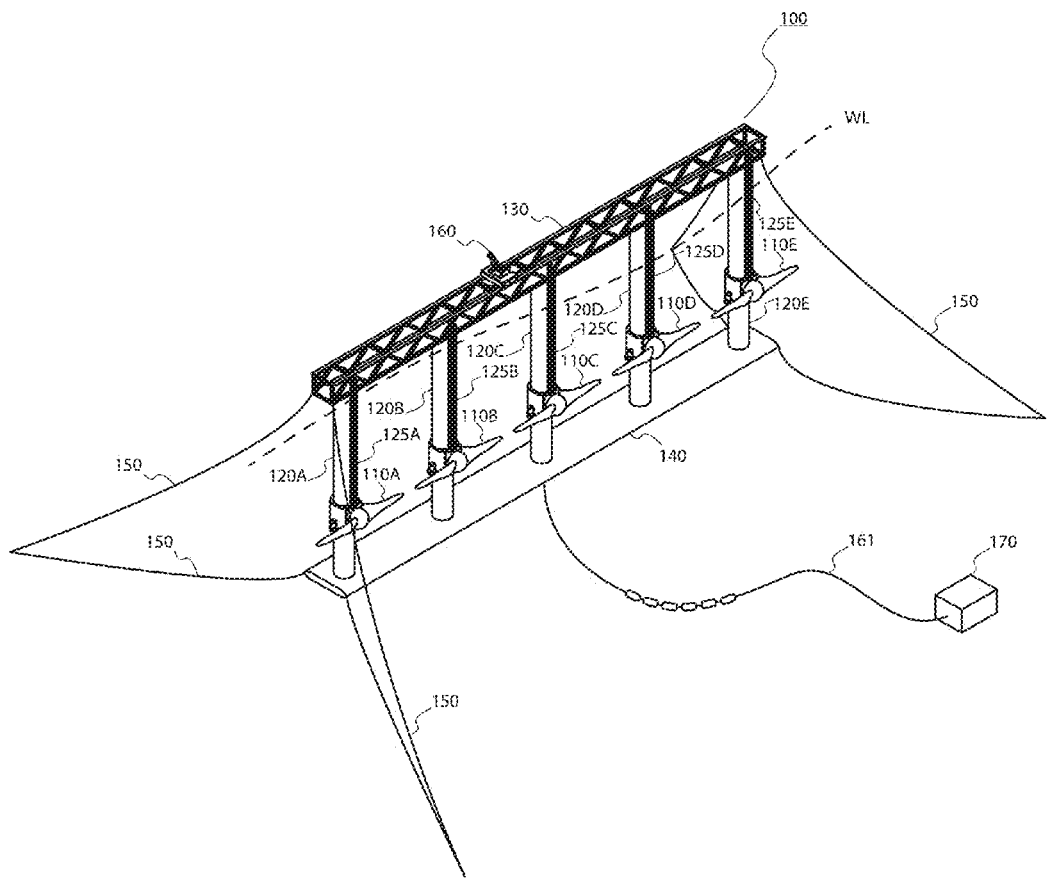
FIG. 1 illustrates an ocean current turbine system according to an embodiment of the invention.

Preferred embodiments of the present invention and their advantages may be understood by referring to FIGS. 1-11, wherein like reference numerals refer to like elements. The present invention may be utilized in any type of moving fluid, e.g., water flow, environment such as, but not limited an ocean current environment or tidal current environment. Although the present invention is described in the context of electrical power generation, it can also be used to provide high pressure seawater for reverse osmosis fresh water production.

FIG. 1 illustrates an ocean current turbine system 100 according to an embodiment of the invention. The ocean current turbine system 100 comprises a plurality of current turbines 110A-E and respective floating towers 120A-E, each turbine 110 disposed on its own tower 120. The towers 120A-E are located (when in operation) between a top structural connecting member 130 above the water line "WL" and a bottom structural connecting member 140 below the water line. The top structural connecting member 130 can be either a truss, a beam, or other suitable structural element, the identification and implementation of which is apparent to one of ordinary skill in the art, to join towers 120A-E together at one end. As shown, the top structural connecting member 130 is illustrated as a truss and therefore will be referred to as such in the remaining description even though other types of a structural connecting member may be used. The bottom structural connecting member 140 is a wing in a preferred embodiment. However, the bottom structural connecting member 140 can alternatively be a truss, beam, or other suitable structural element, the identification and implementation of which is apparent to one of ordinary skill in the art, to join towers 120A-E together at the opposite end. As shown, the bottom structural connecting member 140 is illustrated as a wing and therefore will be referred to as such in the remaining description even though other types of a structural connecting member may be used. The towers 120A-E, truss 130, and wing 140 make a floating frame.

As shown, the system 100 includes five current turbines 110A-E; however any number (greater than one) of turbines 110 with respective towers 120A-E may be implemented. In operation, the turbines 110A-E are located subsurface near the base of the towers 120A-E and horizontal wing 140. This permits the center of gravity of the system 100 to be located in the bottom one-third of the towers 120A-E near the wing 140, while the center of buoyancy is located in the top third of the towers 120A-E below the water line and near the truss structure 130. When in operating position, the entire system 100 floats vertically, with respect to the towers, and appears as a horizontal ladder floating with one side above the water surface. In an embodiment of the invention, the turbines 110A-E and towers 120A-E are modular, which enables the system 100 to provide added turbine capacity by lengthening the truss 130 and the bottom wing 140. The turbines 110A-E may be located at the same relative height along the towers 120A-E or at different heights for added capacity per unit length of the frame.

As further discussed below, a turbine 110 may be driven up and down a respective tower 120 along a track 125 by a motorized gear on the turbine base engaging with a linear gear along the track or cable and pulleys. Alternatively, worm gears, hydraulic pistons, or other means may also be used to drive a turbine 110 along the track 125. The turbine track/drive is herein referred to as the elevator. The truss 130 may include an optional crane 160 that can move along the length of the truss 130 to raise and lower turbines 110A-E, remove the rotor, and handle other components. Power generated by the system 100 may be carried via a power cable 161 to an electrical transfer station 170, the implementation of which is apparent to one of ordinary skill in the art.

In an embodiment of the invention, a turbine 110 may comprise fixed pitch blades or variable pitch blades. Blade spoilers may be optionally implemented to limit the amount of lift created by the blades. In an alternative embodiment of the invention, one or more of the turbines 120A-E may be located on a respective tower 120A-E downstream of the current flow.

Figure 2A:
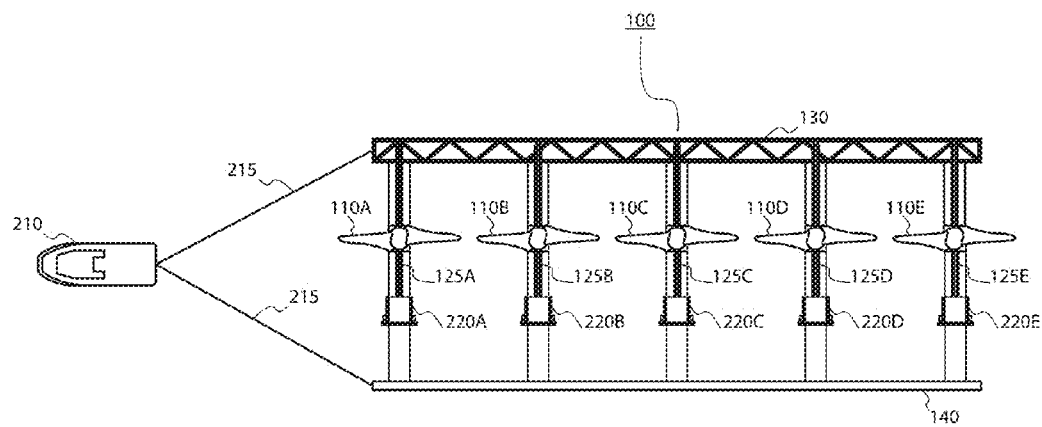
FIGS. 2A and 2B illustrate transportation and deployment of the ocean current turbine system of FIG. 1 to an operating site
Figure 2B:
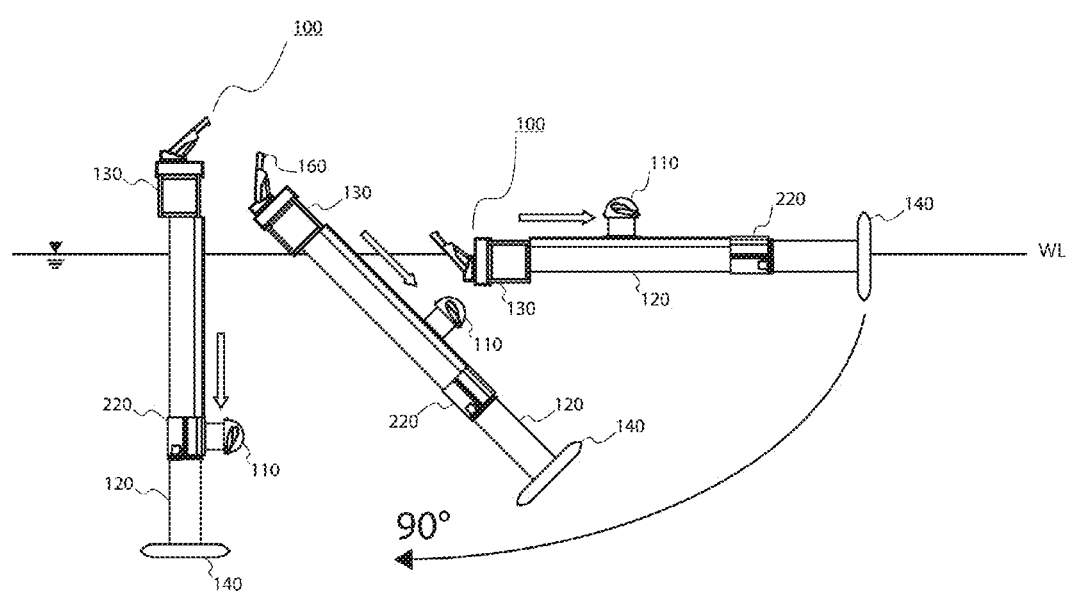

FIG. 2 illustrates transiting and deployment of the ocean current turbine system 100 to an operating site. In towing (e.g., by a boat 210 via towing lines 215) to an operating site as shown in FIG. 2A (viewed from above and looking down on the ocean), the system 100 is allowed to float flat on the ocean surface, to clear shallow areas such as those near a quayside or other littoral area. Once at the operating site as shown in FIG. 2B (which is a side view looking at the end of the system 100), upstream mooring lines (not shown) are attached. When ready for installation of the frame at the operating site, the elevator engages a motor (electric or hydraulic) and gear contained within the turbine base, to a linear gear along the track, thus, the turbine 110 and its base slides along the track. The motor-gear arrangement drives the turbine on its base toward a collar 220A-E, which is aligned to receive the turbine base from the tower track. As turbines 110A-E move along the respective track 125A-E, toward the bottom end of the tower 120A-E, the center of gravity of the frame shifts from the horizontal floating tower central position, used in transiting, to lower end of the tower near the wing, causing the lower end to sink, rotating the tower frame from horizontal to vertical. This may be assisted by ballast tanks (not shown) inside the base of the towers 120A-E and/or in the wing 140, and when flooded, the frame 100 including towers rotates 120A-E ninety (90) degrees from the horizontal transit position, to the vertical operating position. For long-term overhaul, this rotation process is reversed for towing the system 100 back to quayside. The system 100 is moored to seabed anchor(s) with a number of mooring lines 150. For example, mooring lines 150 are disposed at each end of the truss 130 and wing 140 as shown. Optionally, mooring lines 150 may also be at intermittent points along the length of the truss and wing as the system 100 is made longer to accommodate the thrust load of more towers and turbines.

Figure 3:
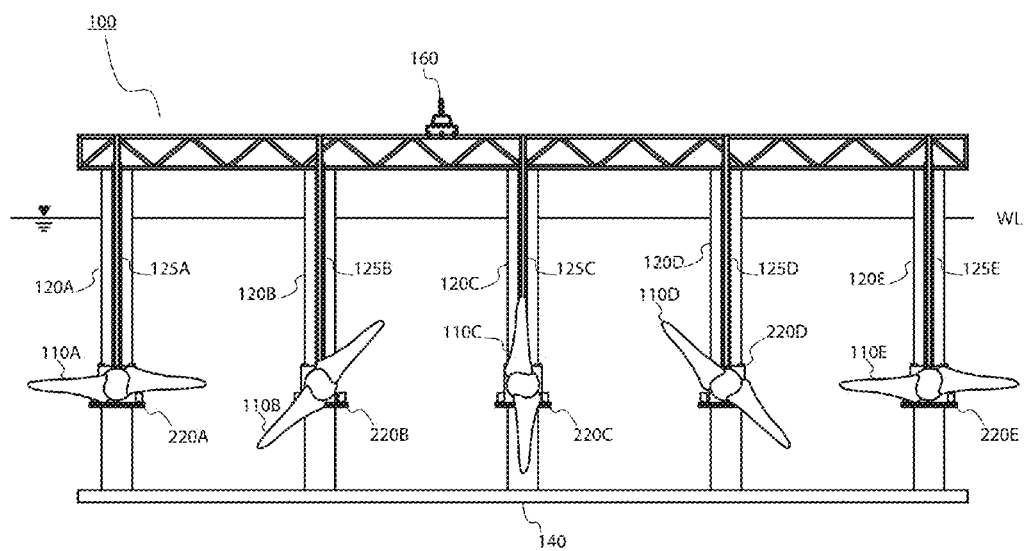
FIG. 3 illustrates a front view of the ocean current turbine system of FIG. 1 in its operating position.

FIG. 3 illustrates a front view of the ocean current turbine system 100 in its operating position. Each turbine 110A-E and the connected turbine base moves along the track and collar yaw (TRAKYAW) system comprising tracks 125A-E and collars 220A-E attached to the towers 120A-E. As shown in more detail in FIG. 4, a TRAKYAW system provides a means of turbine yawing, when in operation. The turbine 110 and its base 112 rides on the vertical track 125. The track 125 provides a means of raising the turbine to the truss 130 above the ocean surface for servicing. Once servicing is completed, a turbine 110 and its base 112 are lowered to the operating position. At the collar 220, the turbine base 112 disengages the track 125 and engages a coupling arrangement similar to the track on the collar. In this position, the turbine 110 is able to yaw around the tower 120 by a collar 220 around the tower 120, on which it is connected. The turbine 110 is coupled to the turbine base 112 via a bearing 114. In an embodiment of the invention, the tower 120 is laminated with low friction material such as teflon or low friction polymer coating on which the collar 220 rotates once it reaches its operating position. Other bearing methods may be used.

Figure 4:
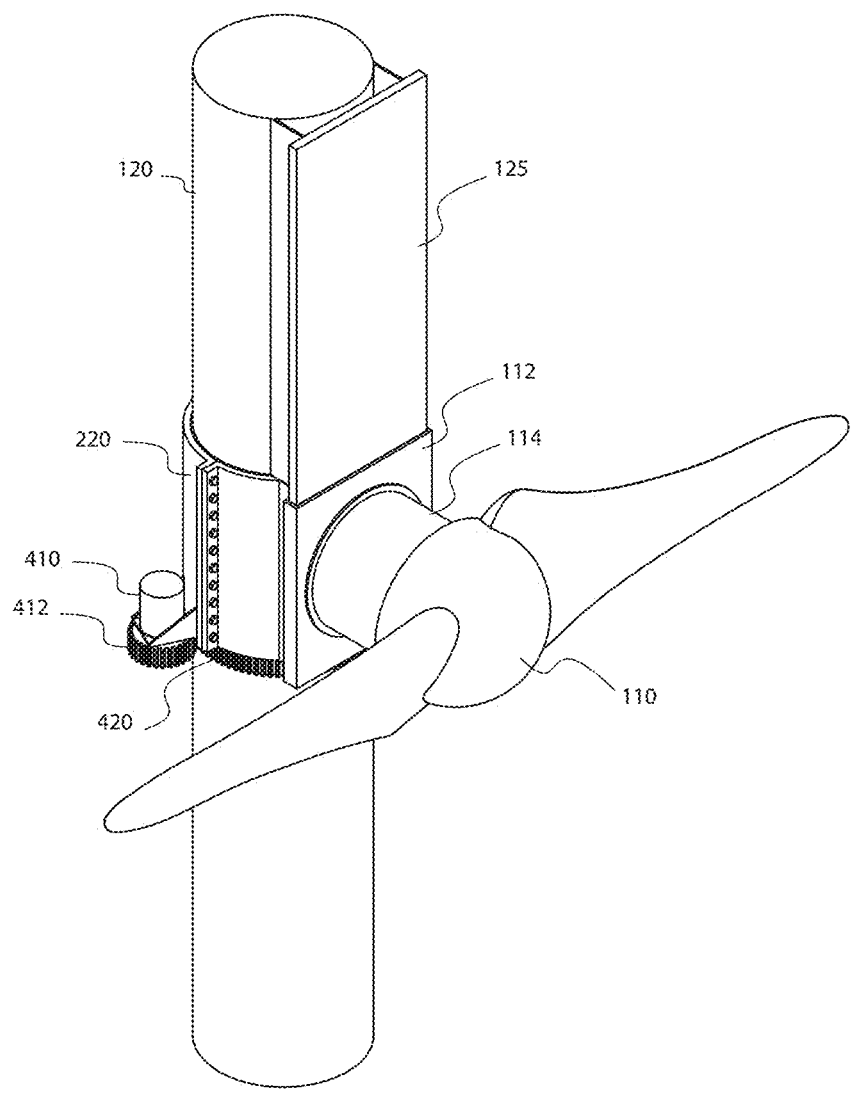
FIG. 4 illustrates a track and collar yaw (TRAKYAW) system attached to a tower according to an embodiment of the invention.

The TRAKYAW system of FIG. 4 comprises hydraulic or electric yaw motors 410 attached to the collar 220. The gears 412 of the yaw motors 410 mesh with a sun gear 420 girdling and connected to the tower 120. Activation of yaw motors 410 rotate the turbine 110 and collar 220 against the sun gear 420 on the tower. In an embodiment of the invention, yaw motor activation is controlled by a current flow direction sensor (not shown). A generator torque control sensor (not shown) may also activate the yaw motor 410. The turbine generator torque control sensor detects current flow speed in excesses of the generator system capacity. The turbine controller is programmed to activate the yaw system to reduce the rotor exposure to the flow, thus limiting the rotor torque to the generating system to stay within its rated loads. The following table presents the relationship between the percentage rotor flow exposure and degrees the rotors are off-axis to flow direction.

| Rotor Flow Exposure | Degrees Off-Axis to Flow Direction |
|---|---|
| 100% | 0° |
| 98% | 10° |
| 87% | 20° |
| 71% | 45° |

This method of torque control benefits from using the yaw system for both yawing to squarely face the current to gain maximum current flow energy capture, while also providing a means of shedding current energy in excesses of the turbine's rated capacity. This is particularly important in tidal flows where the force of extreme flow speed must be mitigated to a productive and economic operation range for the turbine. Yawing "out of the flow" avoids variable pitch blades in a rotor prone to failures and high servicing requirements.

Figure 5:
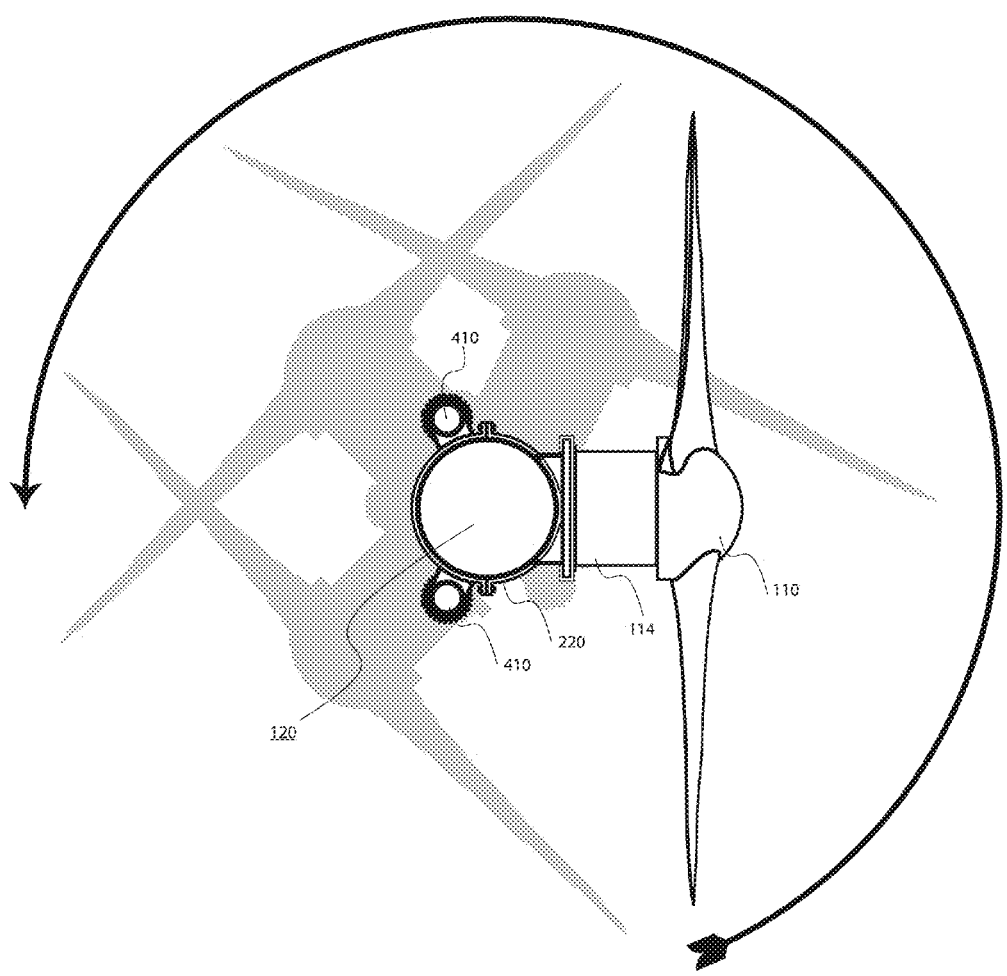
FIG. 5 illustrates a cross-sectional view of the TRAKYAW system of FIG. 4.

FIG. 5 illustrates a cross-sectional view of the TRAKYAW system. When in operation, the collar 220 including its turbine 110 can be rotated or yawed about the tower 120 thereby positioning the rotor blades to squarely face the current flow to optimize the power capture of the current. In an embodiment of the invention, the collar 220 and respective turbine 110 can rotate 350 degrees about a vertical axis (along the tower 120). In most tidal currents yawing would be in the range of 150° to 210°.

Figure 6:
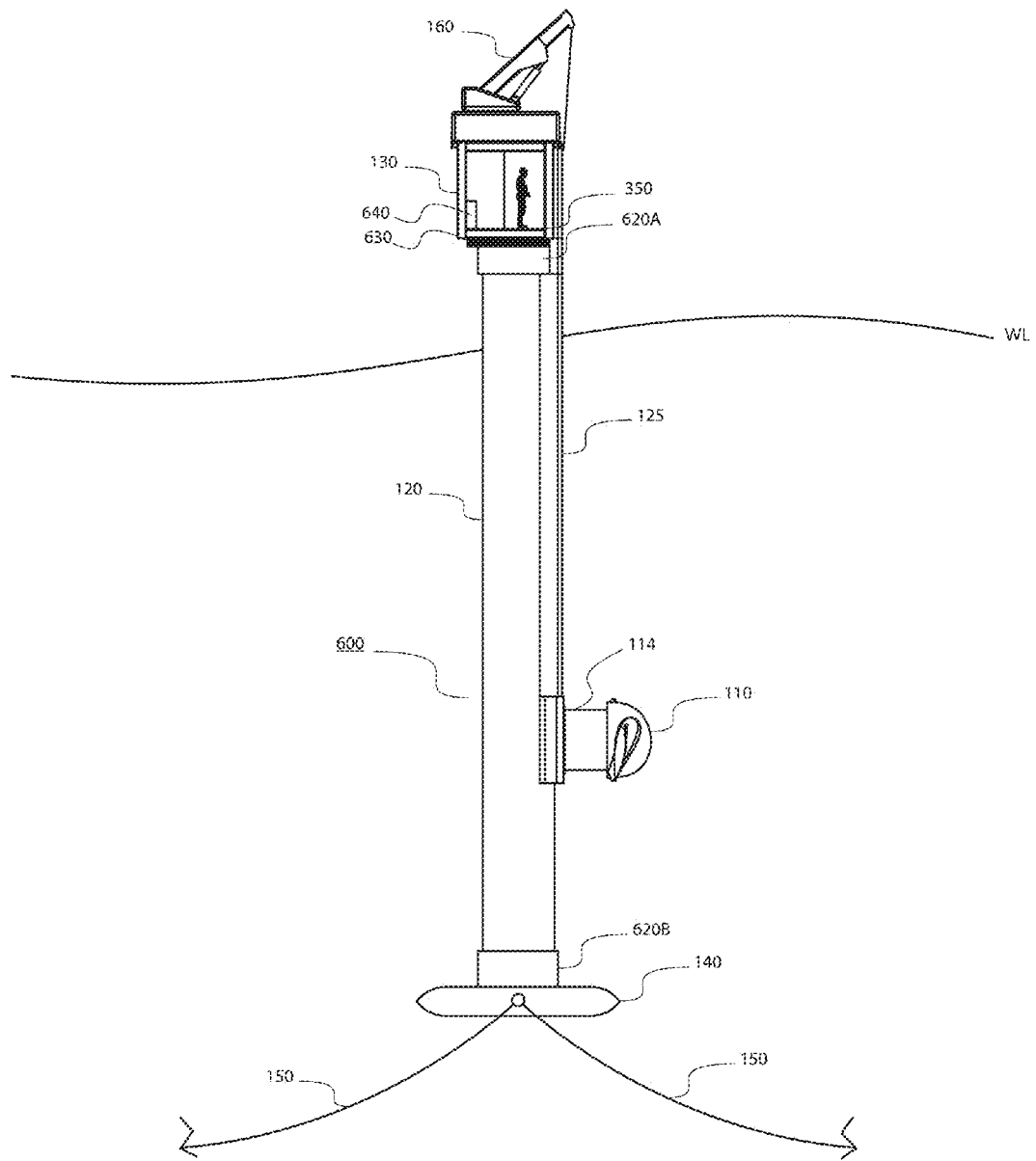
FIG. 6 illustrates a turbine and tower yawing system according to an embodiment of the invention.

FIG. 6 illustrates a turbine and tower yawing system 600 according to an embodiment of the invention. Here, the turbine yawing system 600 comprises a tower top connection to the truss 130 by a rotatable bearing 620A and a bottom of the tower connection to the wing 140 also by a rotatable bearing 620B. In this configuration there is no collar, and in operation the turbine 110 and its base, are at the lower end of the track 125. For yawing the tower and turbine, a sun gear 630 girdling the tower top is driven as required by a yaw motor 640 mounted on the bottom of the truss, with the yaw motor gear engaged with the sun gear 630 on the tower. In this configuration the entire tower 120 and turbine 110 yaws for the rotor to squarely face the flow. The track 125 serves to access the turbine 110 to the operations deck 350 for servicing.

The TRAKYAW system responds when the flow direction sensor detects a deviation in current direction, then the system controller energizes the yaw motors 410 to make a turbine yaw position adjustment upstream of the tower. The TRAKYAW system positions the rotor in the flow much quicker than a passive yaw system, thereby generating power earlier, for overall higher production. This contrast with a passive yaw system which requires the forces of the flow to yaw the turbine 110, moving it to a downstream position (from the tower). Passive yawing where the rotor is downstream of its support structure can result in damaging cyclic loads, since the rotor blades experience substantial stream flow interference (shadowing) from a tower, twice on each revolution.

Figure 7:
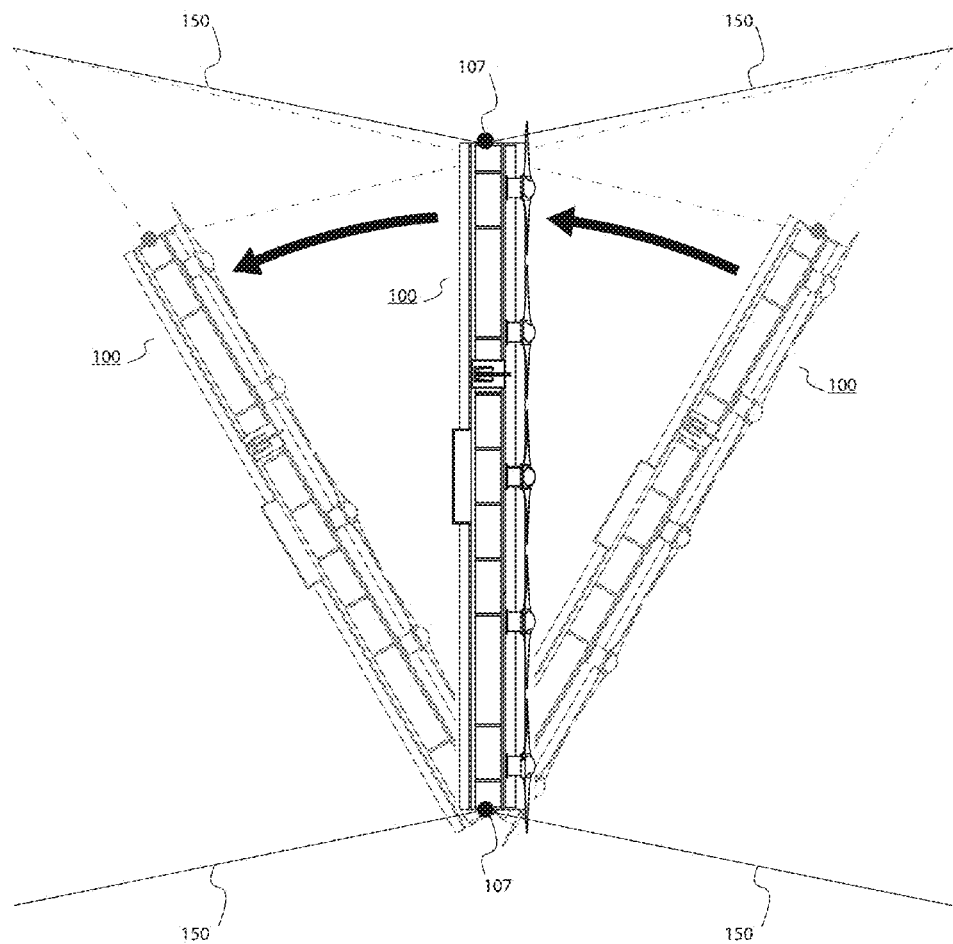
FIG. 7 illustrates a system for changing the azimuth orientation of the ocean current turbine system of FIG. 1.

The preceding TRACKYAW description applies to ocean current turbines operating in tidal flow regimes with periodic flow reversal. In areas where the current usually flows in steady direction and no flow reversal, there may be times when the current meanders and azimuth adjustments in the range of ±20° for the rotors to face the current are required. Under these conditions, the 350° yawing of the individual turbines is not required and the yaw system function may be accomplished by changing the azimuth orientation of the frame as shown in FIG. 7. Here, the ocean current turbine system 100 is viewed from the top looking down on the ocean surface. An azimuth orientation change is accomplished with the mooring lines 150 at each end of the frame. Rather than being permanently secured to the frame, the mooring lines 150 are instead run across or looped over a winch 107, which is controlled to adjust the upstream and downstream mooring line length to the frame, thus altering the heading of the frame. An optional second winch 107 can be used on the opposite side of the frame. This azimuth positioning control by winching the mooring line(s) 150 provides an alternative method of facing the rotors squarely to the current flow without the need for a yaw system on each turbine.

Depth control of the current turbine system 100 is based on buoyancy of the towers 120A-E and hydrodynamic lift of the wing 140, offsetting the gravity force and downward force vector of the current creating drag on rotors and frame due to mooring to the ocean floor. The drag force from the current on the system 100, moored to the ocean floor has two force vectors: horizontal (drag) force and a downward force. The downward force is compensated by the added volumetric displacement as the submerged portion of the towers 120 increases, along with the hydrodynamic lift of the wing 140, resulting from the current. The greater the flow speed, the greater the wing lift to offset the downward force component. This balance of upward and downward forces maintains the current turbine system 100 within the operating range of depth for optimum performance.

Figure 8:
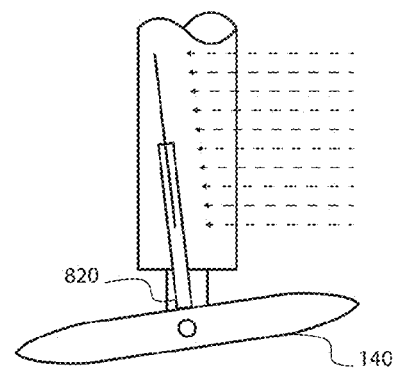
FIG. 8 illustrates three alternative embodiments of the wing of FIG. 1.
Figure 8:
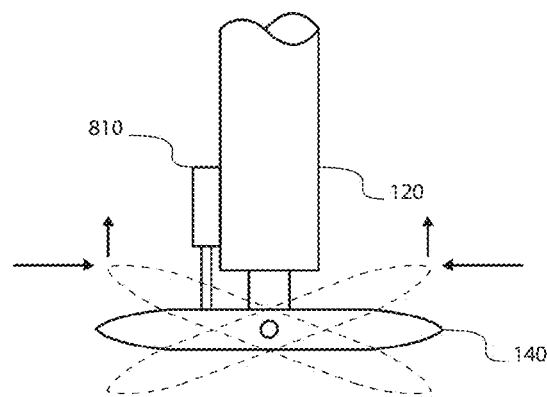
Figure 8:
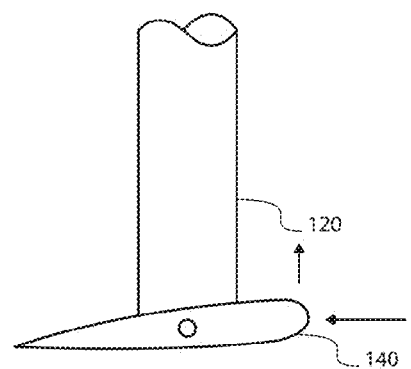

FIG. 8 illustrates three alternative embodiments of the wing 140. As shown in the bottom illustration, the wing 140 comprises a hydrodynamically efficient wing in a fixed pitch position connected to the base of the towers 120A-E. This is preferable when operating in a current that flows with no flow reversal (such as the Florida Gulf Stream). However, in a tidal current, the wing 140 can be fitted to pitch actively or passively. For example, as shown in the center illustration, the wing 140 may vary its pitch relative to the tower via an electromechanical or hydraulic active control mechanism 810 at the base of the towers 120A-E. Here, the control mechanism 810 actively controls the pitch of the wing 140. As shown in the top illustration, the pitch of the wing 140 is passively adjusted via a pivot arm 820, where drag of the current over a drag plate pitches the wing into a position to provide hydrodynamic lift. Adjusting the pitch of the wing 140 provides hydrodynamic lift to the ocean current turbine system 100 and compensates for the downward force vector induced by the current drag on the turbines and the frame moored to the ocean floor. One of ordinary skill in the art readily appreciates that the structure of a wing 140 can be altered before deployment to change its hydrodynamic performance.

The system 100 does not have a connection vessel floating on the surface, which creates unproductive drag across the current flow; rather, the turbine towers 120A-E present the only ocean surface exposure and due to their small volumetric displacement in a passing wave and the distance between the towers 120A-E, the hogging and sagging loads are minimal.

The current turbine system 100 is designed to avoid loads caused by wave action, specifically hogging and sagging loads of a surface vessel being lifted by a wave passing its longitudinal center (hogging) or waves at each end of the wing, with reduced support in the center (sagging load). The current turbine system towers extending through the ocean surface provide minimum exposure to wave "slap" loads.

Current velocity shear typically has the highest flow velocity at the surface, dropping to near zero at the ocean floor. A vessel floating on the surface at a cross angle to the current would require massive mooring and anchoring capacity due to the drag over the length of the vessel, whereas the current turbine system 100 has only the towers below the surface and the low drag wing 140 at the bottom of the towers 120A-E. Therefore the principal drag of the system 100 is from the rotors, harnessing the power in the flow, and the mooring and anchoring structural requirements are thus reduced.

By this reduced surface exposure design, the current turbine system 100 requires far less structural material and can be made much larger providing a cost competitive advantage. A major cost component of ocean current generating systems is the power cable to shore and the mooring and anchoring. Therefore it is advantageous to have more turbines per system that can utilize the same mooring and anchoring, along with a single power cable.

Figure 9:
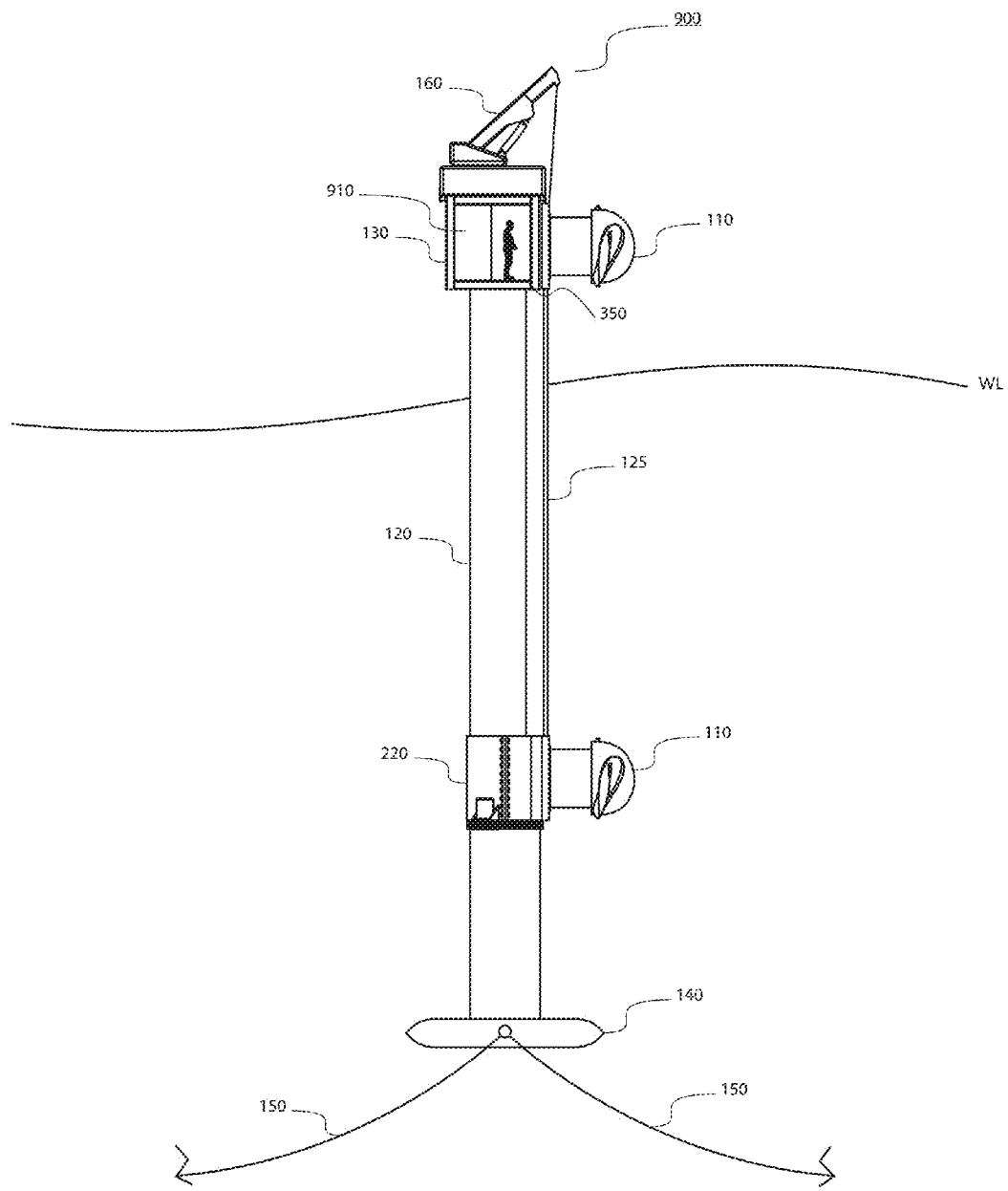
FIG. 9 illustrates a current turbine system according to another embodiment of the invention.

FIG. 9 illustrates a current turbine system 900 according to another embodiment of the invention. The box truss structure 130 spans the tops of the towers 120 above the ocean surface and serves as a platform for service crews to board and maintain the turbines 110. The bottom of the box truss 130 is the operations deck 350, while the top serves as a track for the crane 160 to traverse the length of the truss 130 for accessing the turbines 110. The combination of the elevator TRAKYAW system 125 and the crane 160 enables each turbine 110 to be serviced on the operations deck 350 of the truss 130 under most weather and sea conditions. Generating power continues from the rest of the turbines 110B-E while a particular turbine 110A is being serviced.

Located on the operations deck 350 of the truss 130 is an equipment cabin 610 containing electric power conditioning equipment (not shown) and may contain a hydrostatic motor (not shown) to drive an electric generator (not shown). In this embodiment of the invention, the low speed (RPM), high torque of the turbine, drives a hydrostatic pump (not shown) on a common shaft delivering high pressure hydraulic fluid to the hydrostatic motor driving the generator at high speed (RPM) for efficient power generation. Multiple turbine pumps may feed into a common manifold serving the hydrostatic motor driving the generator. The electric power is delivered from the generators via a submarine cable to a shore substation.

In another embodiment of the invention, the equipment cabin 610 may also contain a reverse osmosis membrane bank (not shown) whereby the turbines 110A-E drive a sea water pump (not shown) delivering high pressure seawater to the reverse osmosis membrane bank for delivery of fresh water by pipeline connection to a shore receiving station.

Figure 10:
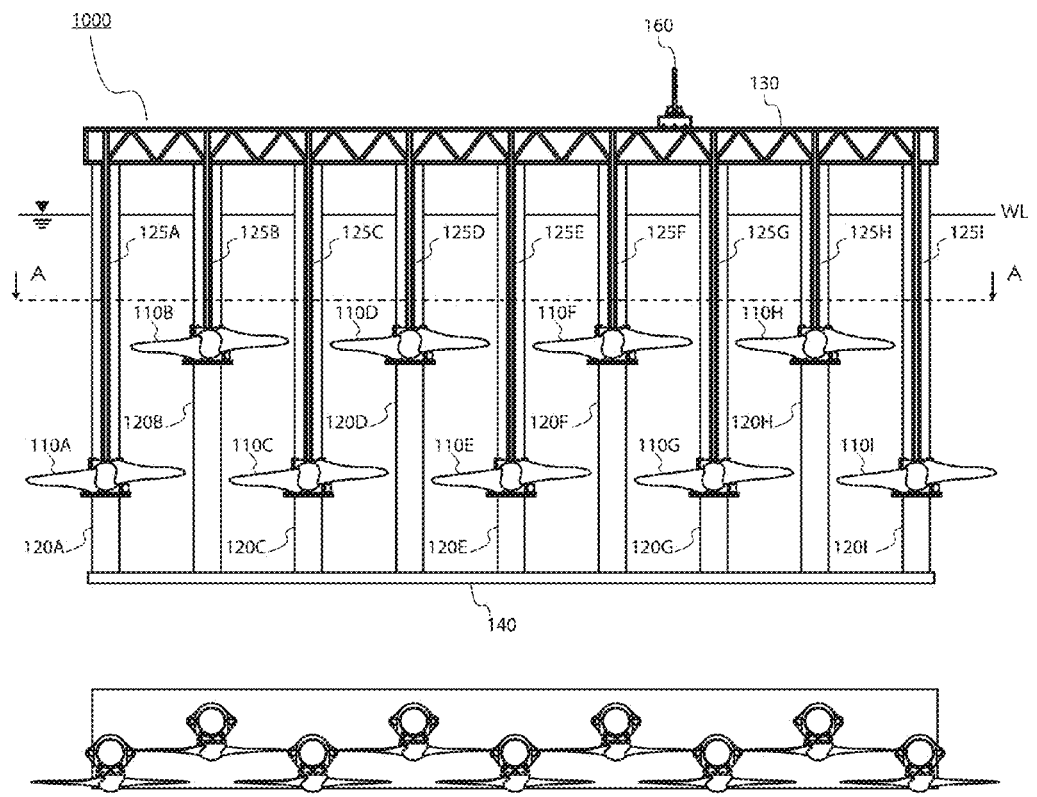
FIG. 10 illustrates a current turbine system according to another embodiment of the invention.

FIG. 10 illustrates a current turbine system 1000 according to another embodiment of the invention. Here, the current turbine system 1000 comprises turbines 110A-I and towers 120A-I with TRAKYAWS 310, truss 130, wing 140, and a crane 160. The turbines 110A-I are offset from one another, i.e., odd turbines 110A, 110C, 110E, 110G, and 110I are located closer to the wing 140 than even turbines 110B, 110D, 110F, and 110H. In other words, multiple rows of turbines 110 are disposed at varying depth. As shown in the cross-sectional view AA, the towers 120A-I are also offset from one another. Such a configuration increases the electric power generating capacity and number of turbines 110 per length of truss 130.

Figure 11:
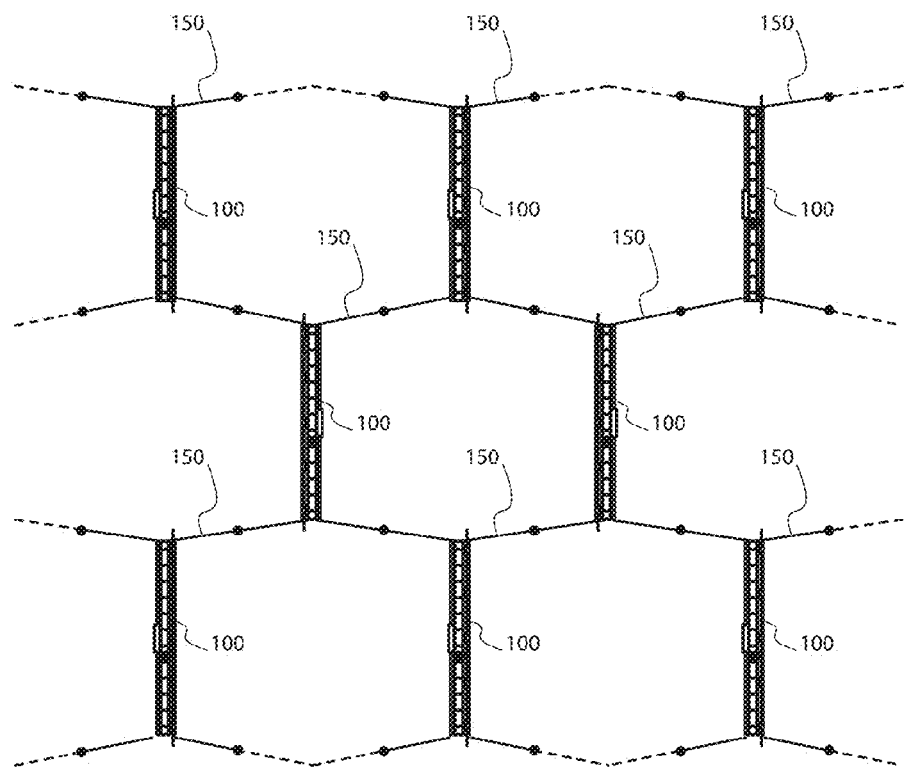
FIG. 11 illustrates a current turbine farm according to an embodiment of the invention.

FIG. 11 illustrates a current turbine farm 1100 according to an embodiment of the invention. Here, a plurality of current turbine systems 100 (or 900, 1000) are placed in a honeycomb pattern as shown (looking down from above the ocean surface). Any number of current turbine systems 100 may be employed. The current turbine systems 100 are connected to one another via mooring lines 150 and shared anchors (shown by black dots).

The invention has been described herein using specific embodiments for the purposes of illustration only. It will be readily apparent to one of ordinary skill in the art, however, that the principles of the invention can be embodied in other ways. Therefore, the invention should not be regarded as being limited in scope to the specific embodiments disclosed herein, but instead as being fully commensurate in scope with the following claims.

I claim:

1. A marine current turbine system comprising:
    a floating frame, wherein the floating frame comprises:
        a top structural connecting member,
        a bottom structural connecting member, and
        a plurality of towers comprising a top end and a bottom end, wherein the top end is affixed to the top structural connecting member and the bottom end is affixed to the bottom structural connecting member; and
    a plurality of turbines, wherein each turbine is located on a respective one of the plurality of towers, wherein each tower comprises an elevator to raise and lower its respective turbine relative to that tower, and
    wherein the top structural connecting member sits above a water line, the bottom structural connecting member sits below the water line, and a center of gravity of the overall current turbine system is below its center of buoyancy.

2. The marine current turbine system of claim 1, wherein the bottom structural connecting member comprises a wing.

3. The marine current turbine system of claim 2, wherein the wing is fixed relative to the plurality of towers.

4. The marine current turbine system of claim 2, wherein the wing provides hydrodynamic lift to the floating frame.

5. The marine current turbine system of claim 1, wherein each tower comprises a collar for affixing a turbine to a tower.

6. The marine current turbine system of claim 5, wherein the collar can rotate about its tower.

7. The marine current turbine system of claim 1, wherein each elevator further comprises a mechanical or hydraulic drive to raise and lower each respective turbine.

8. The marine current turbine system of claim 1, further comprising one or more ballast tanks for sinking or floating a bottom end of the floating frame.

9. The marine current turbine system of claim 1, wherein the plurality of towers float on water.

10. The marine current turbine system of claim 1, wherein each of the plurality of towers are rotatable about its tower axis.

11. The marine current turbine system of claim 1, wherein each turbine comprises a torque control sensor and each respective tower comprises a yaw motor, wherein the torque control sensor detects current flow speed and activates, if the detected current flow speed is in excess of a predetermined limit, the yaw motor to reduce a respective turbine's exposure to a current flow.

12. The marine current turbine system of claim 1, wherein the plurality of towers include a first group of towers and a second group of towers, wherein the first group of towers are located in an upstream geometrical plane and the second group of towers are located in a downstream geometrical plane, the upstream geometrical plane is parallel to the downstream geometrical plane, and turbines in the upstream geometrical plane do not interfere with a current flow to turbines in the downstream geometrical plane.

13. The marine current turbine system of claim 1, further comprising a mooring line connected to each end of the floating frame to rotate the floating frame about a vertical axis.

14. The marine current turbine system of claim 1, wherein each turbine comprises variable pitch blades.

15. The marine current turbine system of claim 1, wherein one of the plurality of turbines can be shut down and serviced without affecting operation of the remaining turbines within the plurality of turbines.

16. A marine current turbine system comprising:
    a floating frame, wherein the floating frame comprises:
        a top structural connecting member,
        a bottom structural connecting member, and
        a plurality of towers affixed to the top structural connecting member and to the bottom structural connecting member; and
    a plurality of turbines, wherein a turbine is located on a respective one of the plurality of towers, wherein the bottom structural connecting member comprises a wing and a pitch control for adjusting a pitch of the wing relative to the plurality of towers.

17. The marine current turbine system of claim 16, wherein the pitch control comprises an active control mechanism.

18. A marine current turbine system comprising:

a floating frame, wherein the floating frame comprises:
- a top structural connecting member,
- a bottom structural connecting member, and
- a plurality of towers affixed to the top structural connecting member and to the bottom structural connecting member; and a plurality of turbines, wherein a turbine is located on a respective one of the plurality of towers, wherein each tower comprises a collar for affixing a turbine to a tower, a track for raising and lowering the turbine relative to the structural connecting member, and a mechanical or hydraulic drive to raise and lower a turbine on its track, wherein lowering the turbines shifts a center of gravity of the system to rotate the frame from horizontal to vertical.

19. A marine current turbine system comprising:

a floating frame, wherein the floating frame comprises:
- a structural connecting member,
- a pitch adjustable wing, wherein the pitch adjustable wing provides hydrodynamic lift to the floating frame, and
- a plurality of towers connecting the structural connecting member to the wing; and a plurality of turbines, wherein a turbine is located on a respective one of the plurality of towers and the pitch adjustable wing may vary its pitch relative to the plurality of towers.

* * * * *